US012770485B2

(12) United States Patent
Schwartz

(10) Patent No.: US 12,770,485 B2
(45) Date of Patent: Oct. 20, 2026

(54) SYSTEM AND METHOD FOR DYNAMICALLY ALLOCATING MONITORING SENSORS IN INTELLIGENT WALKING GUARD

(71) Applicant: Isabella H. Schwartz, Ashburn, VA (US)

(72) Inventor: Isabella H. Schwartz, Ashburn, VA (US)

( * ) Notice: Subject to any disclaimer, the term of this patent is extended or adjusted under 35 U.S.C. 154(b) by 149 days.

(21) Appl. No.: 18/958,912

(22) Filed: Nov. 25, 2024

(65) Prior Publication Data

US 2025/0095469 A1 Mar. 20, 2025

Related U.S. Application Data

(63) Continuation of application No. 17/992,437, filed on Nov. 22, 2022, now Pat. No. 12,190,697.

(60) Provisional application No. 63/282,345, filed on Nov. 23, 2021.

(51) Int. Cl.
*G08B 21/02* (2006.01)
*H04W 4/029* (2018.01)

(52) U.S. Cl.
CPC ............ *G08B 21/02* (2013.01); *H04W 4/029* (2018.02)

(58) Field of Classification Search
CPC . G08B 21/02; G08B 21/0469; G08B 21/0476
See application file for complete search history.

(56) References Cited

U.S. PATENT DOCUMENTS 10,425,525 B1 * 9/2019 Bitetto .................. G08B 21/24

* cited by examiner

*Primary Examiner* — Benyam Haile
(74) *Attorney, Agent, or Firm* — Venable LLP

(57) ABSTRACT

The present teaching relates to smart walking guard via dynamically allocated sensors. When a user interacts with a device while walking, the device's location is detected based on information from a designated sensor. Depending on whether the device is in front of or near a side of the user, different sensors on the device are allocated accordingly to detect and detect obstacles in different directions. Based on data from dynamically allocated sensors, a distance to each monitored obstacle is estimated. A warning is issued to the user on the device about each obstacle when it satisfies an alert condition.

20 Claims, 13 Drawing Sheets

700

SYSTEM AND METHOD FOR DYNAMICALLY ALLOCATING MONITORING SENSORS IN INTELLIGENT WALKING GUARD

CROSS REFERENCE TO RELATED APPLICATIONS

The present application is a continuation of U.S. patent application Ser. No. 17/992,437, filed on Nov. 22, 2022, which claims the benefit and priority of U.S. Provisional Patent Application No. 63/282,345, filed Nov. 23, 2021, the contents of which are hereby incorporated by reference in their entireties.

BACKGROUND

1. Technical Field

The present teaching generally relates to electronics. More specifically, the present teaching relates to applications deployed on electronic devices.

2. Technical Background

With the development of various smart devices, ubiquitous Internet connections, and ever-present applications, many people in a modern society live almost constantly with a handheld device that delivers and transmits information from/to others in the world. Never in the past that the distance among people has been shrunk to a degree that it does not really make a difference between a person and the other the person is communicating in real-time. As such, the volume of communication and the amount of information accessible from a personal handheld device has exploded exponentially and continues to grow. More and more people in a modern society increasingly are hooked to their devices, spending a significant chuck of their lives focusing on the screen of their devices, whether they are eating, walking, driving, or even during sleeps.

The situation depicted in FIG. 1A is commonly seen today, where different people 100, 105, 110, and 115 are walk on a street, yet all focusing only on their devices. FIG. 1B illustrates also what is commonly seen in the streets, where although the devices at issue may be held in different ways, one common observation is that all of the people as depicted have their eyes locked on their device screens and none pays attention on where they are going. Even when people may not stare at device screens, e.g., when they are talking to someone else on the phone while walking, as shown in FIG. 1C, their attention frequently is not on what is in front of them because their brain is simply on what is going on in the conversation.

This problem associated with the ubiquitous use of smart devices for information access or communication via internet connections can lead to dangerous situations. Not paying attention to what is in front of a car can lead to accidents. Without realizing what is in the front while walking may lead to bumping into some obstacle which usually can easily be avoided if the person walking pays attention. Although different states enacted laws prohibiting people texting while driving, there is no law at present time restricting a person engaging in communications, particularly reading from a device, while walking. It is unlikely that such activities will be subject to regulation.

Thus, there is a need for a solution that address the problem described and enhance the performance of the traditional approaches.

SUMMARY

The teachings disclosed herein relate to methods, systems, and programming for information management. More particularly, the present teaching relates to methods, systems, and programming related to hash table and storage management using the same.

In one example, a method, implemented on a machine for a smart walking guard via dynamically allocated sensors. When a user interacts with a device while walking, the device's location is detected based on information from a designated sensor. Depending on whether the device is in front of or near a side of the user, different sensors on the device are allocated accordingly to detect and detect obstacles in different directions. Based on data from dynamically allocated sensors, a distance to each monitored obstacle is estimated. A warning is issued to the user on the device about each obstacle when it satisfies an alert condition.

In a different example, a system is disclosed for a smart walking guard via dynamically allocated sensors. The system includes a device activity detector, a device position detector, a sensor designation determiner, a distance determiner, and a message output controller. The device activity detector is configured for detecting automatically that a user is actively interacting with a device while walking. The device position detector is configured for detecting a location of the device in front of or near one side of the user. The sensor designation determiner is provided for allocating sensors deployed on the device to monitor obstacles in different directions based on the location of the device relative to the user. The distance determiner is provided for estimating the distance between each detected obstacle and the user. The message output controller is provided for delivering a warning to the user on the device about each obstacle when the obstacle satisfies an alert condition.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for a smart walking guard via dynamically allocated sensors. The information, when read by the machine, causes the machine to perform the following steps. When a user interacts with a device while walking, the device's location is detected based on information from a designated sensor. Depending on whether the device is in front of or near a side of the user, different sensors on the device are allocated accordingly to detect and detect obstacles in different directions. Based on data from dynamically allocated sensors, a distance to each monitored obstacle is estimated. A warning is issued to the user on the device about each obstacle when it satisfies an alert condition.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching aims to provide a solution to detection of surrounding of a person in motion with a handheld device and alert the person when obstacles in a predetermined range are detected. The solution may be provided as a built-in walking guard application deployed on a handheld device. It may be automatically activated whenever it detects that the device is in motion (with the person holding the device) and there are interaction activities directed to at least one application on the device. Once activated, the built-in walking guard activates various sensors in the device to acquire visual information around the device, analyzes the visual information, detects surrounding of the device such as obstacles, and issues alerts of such obstacles.

Figure 1A:
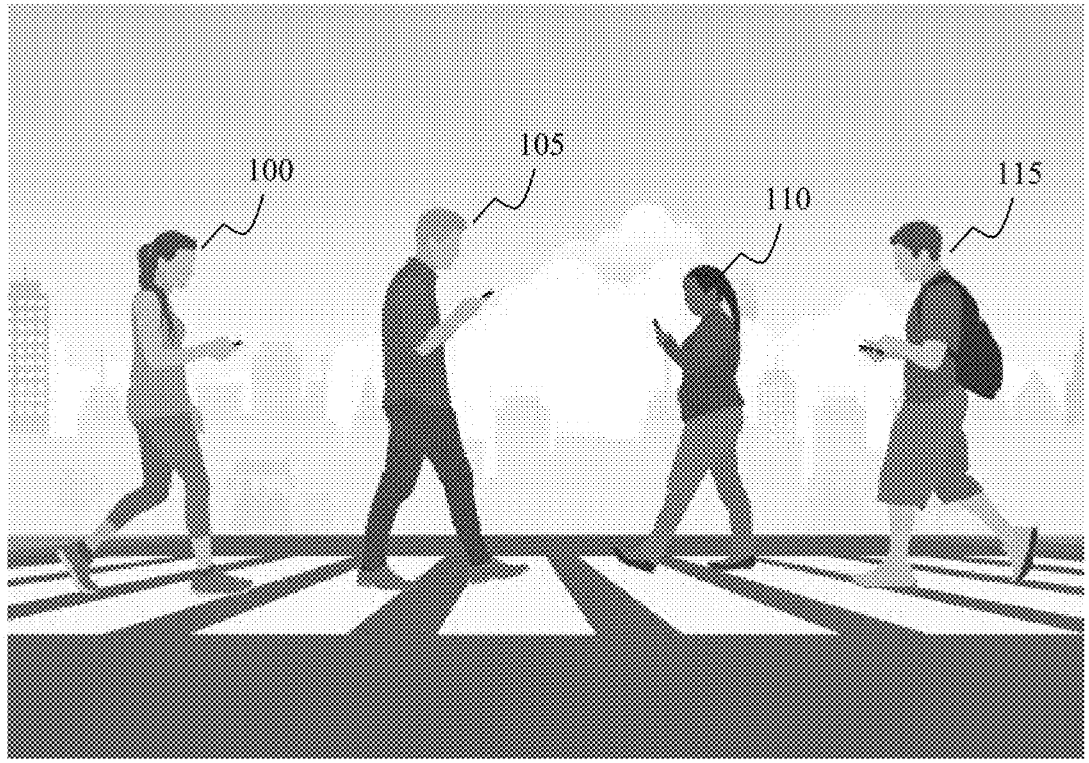
FIGS. 1A-1C provide examples of people walking while paying no attention to what is in front.
Figure 1B:
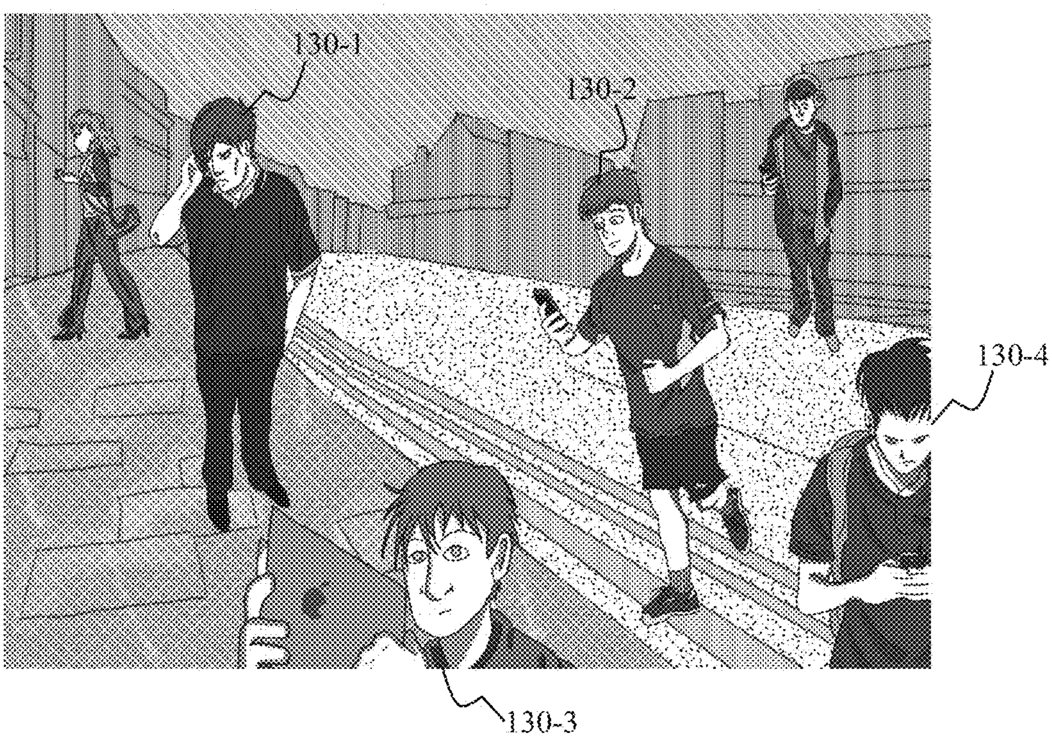
Figure 1C:
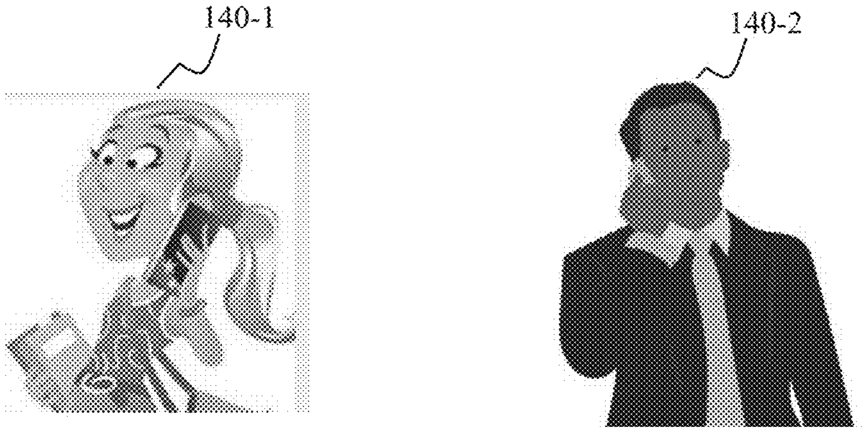
Figure 2A:
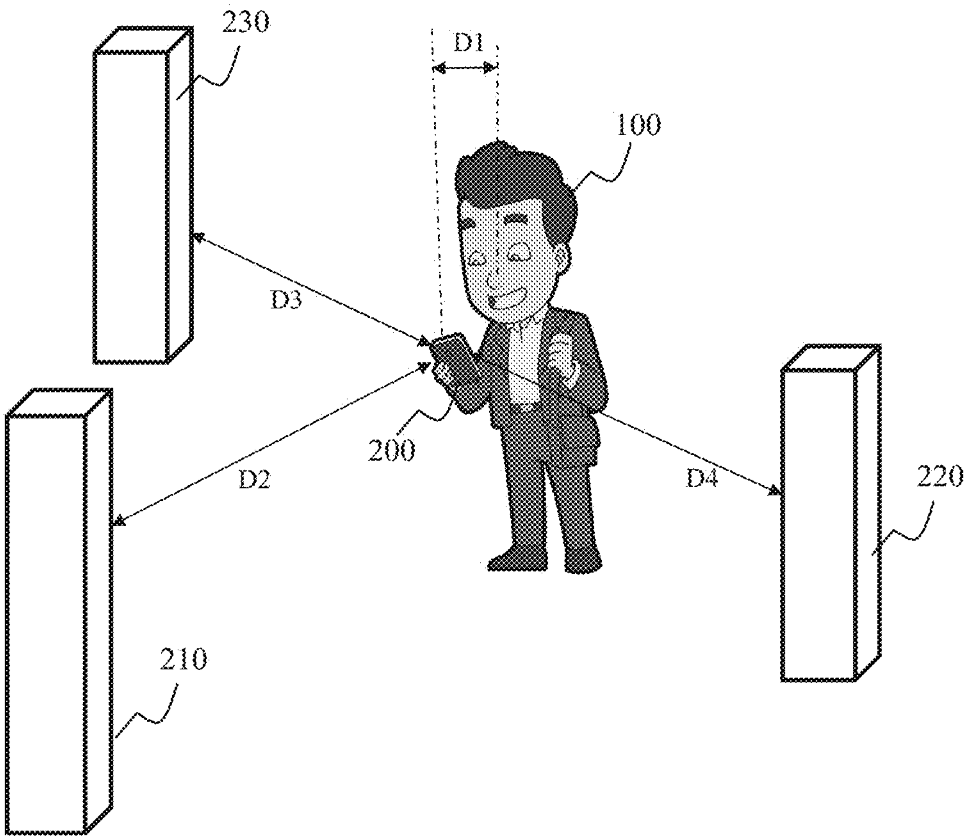
FIG. 2A depicts an exemplary configuration in which a built-in walking guard detects surrounding of a handheld device located in front of a user, in accordance with an embodiment of the present teaching.

FIG. 2A depicts an exemplary configuration in which a built-in walking guard deployed in a handheld device 200 detects surrounding of the device held in front of a user 100, in accordance with an embodiment of the present teaching. In this illustration, the user 100 is holding device 200 in front of his/her face while walking so that the user is facing the screen of the device. There may be obstacles around the user, which may include an obstacle 210 in front of the user, an obstacle 220 on the left of the user 100, an obstacle 230 on the right of the user 100, or any other obstacles at any other locations therebetween. The goal of the built-in walking guard is to help the user to avoid unknowingly getting too close to any of the obstacles. To achieve that, the distance between each observed obstacle and the user may be estimated continuously on-the-fly and when a certain condition is met with respect to the obstacle, the built-in walking guard may issue alerts.

To estimate the distances to obstacles, information about the surrounding of the user may be acquired. Different sensors may be deployed on device 200 and data such sensors acquire from the surroundings may be used to not only detect presence of nearby obstacles but also estimate corresponding distances from the device 200. For example, visual sensors such as cameras may be deployed. Depth sensor may also be installed to facilitate distance estimation. In some embodiments, visual sensors may be used to detect obstacles as well as to estimate depth to each. In some embodiments, visual sensor may be used to detect presence of obstacles and depth sensor information may be used for computing the distances. In some embodiments, depth sensors may be used to both detect presence of obstacle in a certain distance range and the specific distances to some obstacles.

Figure 2B:
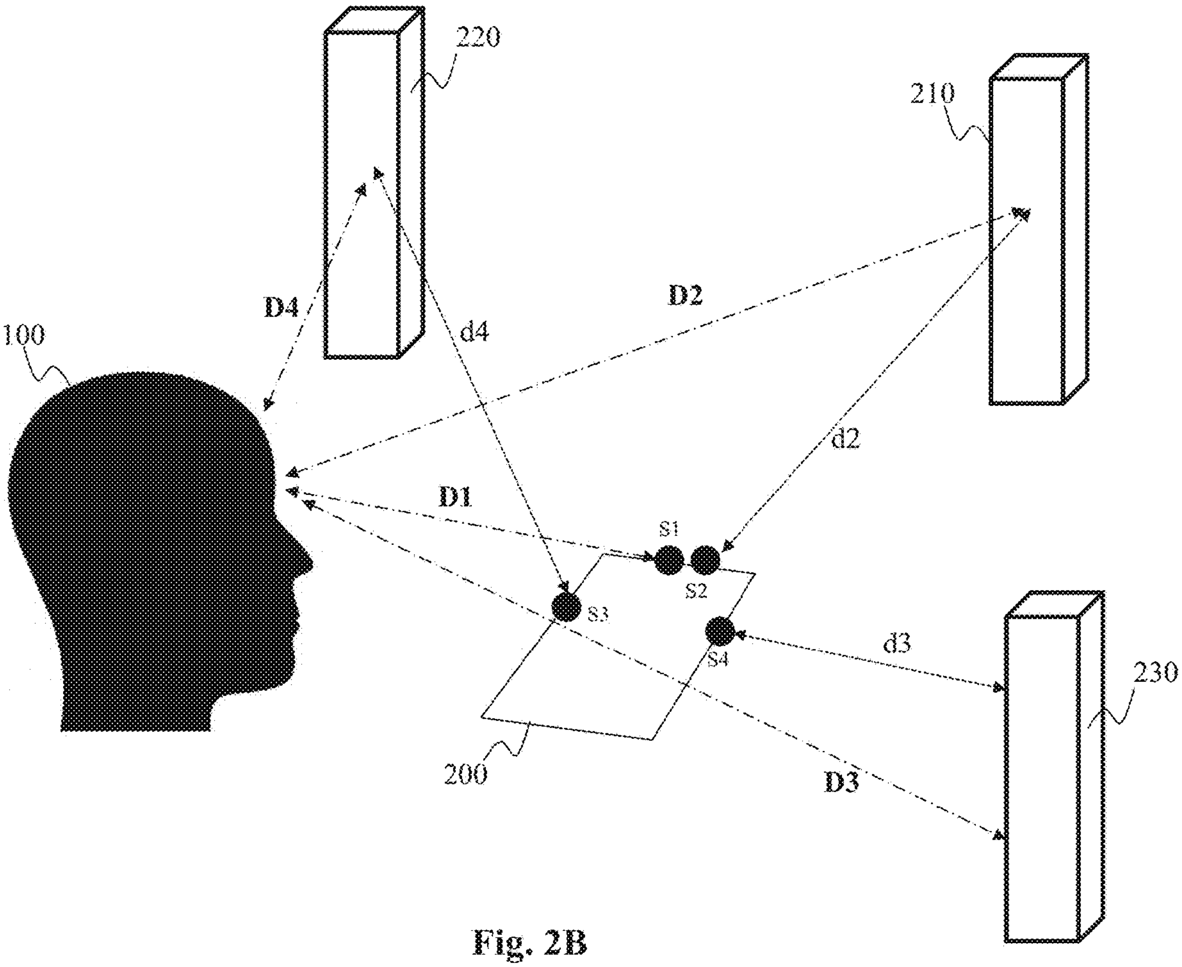
FIG. 2B illustrates an exemplary operational scheme of a built-in walking guard for detecting surrounding of a handheld device located in front of a user, in accordance with an embodiment of the present teaching.

As illustrated in FIG. 2B, there are several exemplary sensors, e.g., sensor blocks S1, S2, S3, and S4, installed to facilitate detection of obstacles such as 210, 220, and 230. Each camera may have its field of view and may be used to capture what is seen in the field of view. In some embodiments, depth sensors may also be deployed on device 200. Such depth sensors may be deployed with appropriate calibration with the visual sensors. The deployed sensors obtain relevant information of the user 100 as well as the surrounding. Each of the sensors may be installed so that it is directed to gather information in a particular target area. For instance, as illustrated, sensor block S1 may be deployed to capture what is in front of the device screen so that if a user holds the device in the front, what S1 captures is information of the user's face. When S1 includes a pair of stereo cameras, distance D1 between the user's face and the cameras may be estimated via stereo. When S1 includes a visual and a depth sensors, distance D1 may also be estimated by detecting the face of the user and then use the depth measure in the corresponding region in the depth map when the visual sensor and the depth sensor are properly calibrated.

Sensor block S2 may be installed on the opposing side of the screen of device 200 and is configured to capture surrounding information in front of the device 200 (or the user 100). When the sensors in block S2 are appropriately deployed and calibrated, the information captured by sensors in block S2 may be used to determine the distance d2 between the device 200 and the obstacle 210 in the front. Such estimated distance d2 can be used to directly approximate the distance between the user 100 and obstacle 210 or may be used in conjunction with the distance D1 from the device 200 to the user 100 to estimate D2 as a function of d2 and D1 (e.g., D2=d2+D1). Similarly, sensors in sensor block S3 may be used to capture information in the left surrounding of the user and the sensor information from sensors in S3 may be analyzed to compute the distance d4 between the sensors in S3 and an obstacle 220 on the left side of the user 100. The estimated distance d3 may be used as an estimated distance between the user 100 and the obstacle 220. Sensors in sensor block S4 may be similarly configured to detect presence of obstacles on the right side of the user 100 and compute a distance d3 between sensors in block S4 and an obstacle 230 on the right, which may be used to approximate the distance between the right obstacle 230 and the user 100.

In this manner, based on the image data and/or depth data from different sensors directed to different regions in the surrounding, various relevant distances may be computed. When the device 200 is in front of the user while being used, the device 200 is likely held quite close to the user 100. In this case, the distances between the device 200 and various obstacles may be used to approximate the distances between the user 100 and the various obstacles. FIG. 2B depicts a configuration of sensors on a device at front top (S1 block), back top (S2 block), left side (S3 block) from a user's perspective, and right side (S4) from the user's perspective. With such deployment, sensors in each sensor block has some designated role to play, i.e., for detecting presence of obstacle(s) in different directions and for estimating distances between the user and the respective obstacles detected in the designated areas.

Figure 3A:
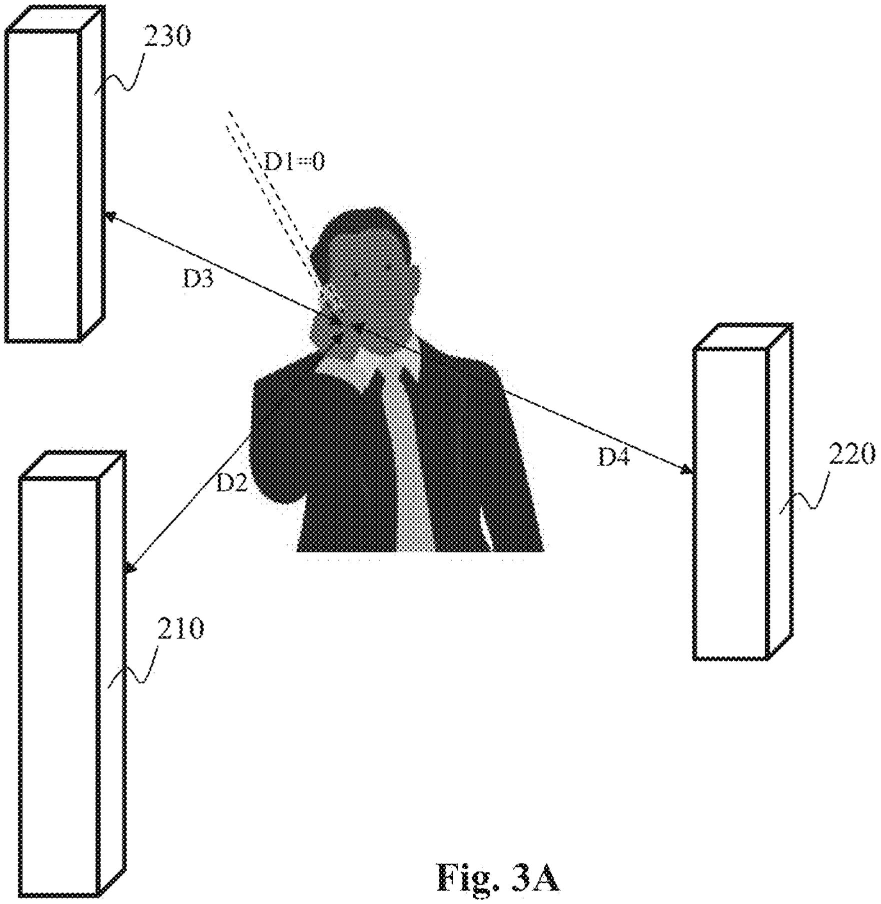
FIG. 3A depicts an exemplary configuration in which a built-in walking guard detects surrounding of a handheld device held next to an ear of a user, in accordance with an embodiment of the present teaching.

In some situations, a user may use device 200 (e.g., a smart phone) for a phone conversation while walking, as shown in FIG. 3A, where a person is holding a phone next to her ear to conduct a conversation over the phone. In this situation, the distance D1 between the device to the user may be close to zero. This may be detected and used to recognize that it is now in a different situation than what is shown in FIG. 2B. For example, in FIG. 2B, sensors in sensor block S2 (on the back of the phone) are used for detecting obstacles in the front. In FIG. 3A, this can no longer be the case as the field of view of sensors in sensor block S2 are now on a side depending on which ear the phone is close to. Thus, depending on the situation, sensors in different sensor blocks may be used for detecting obstacles located in different designated nearby regions.

Figure 3B:
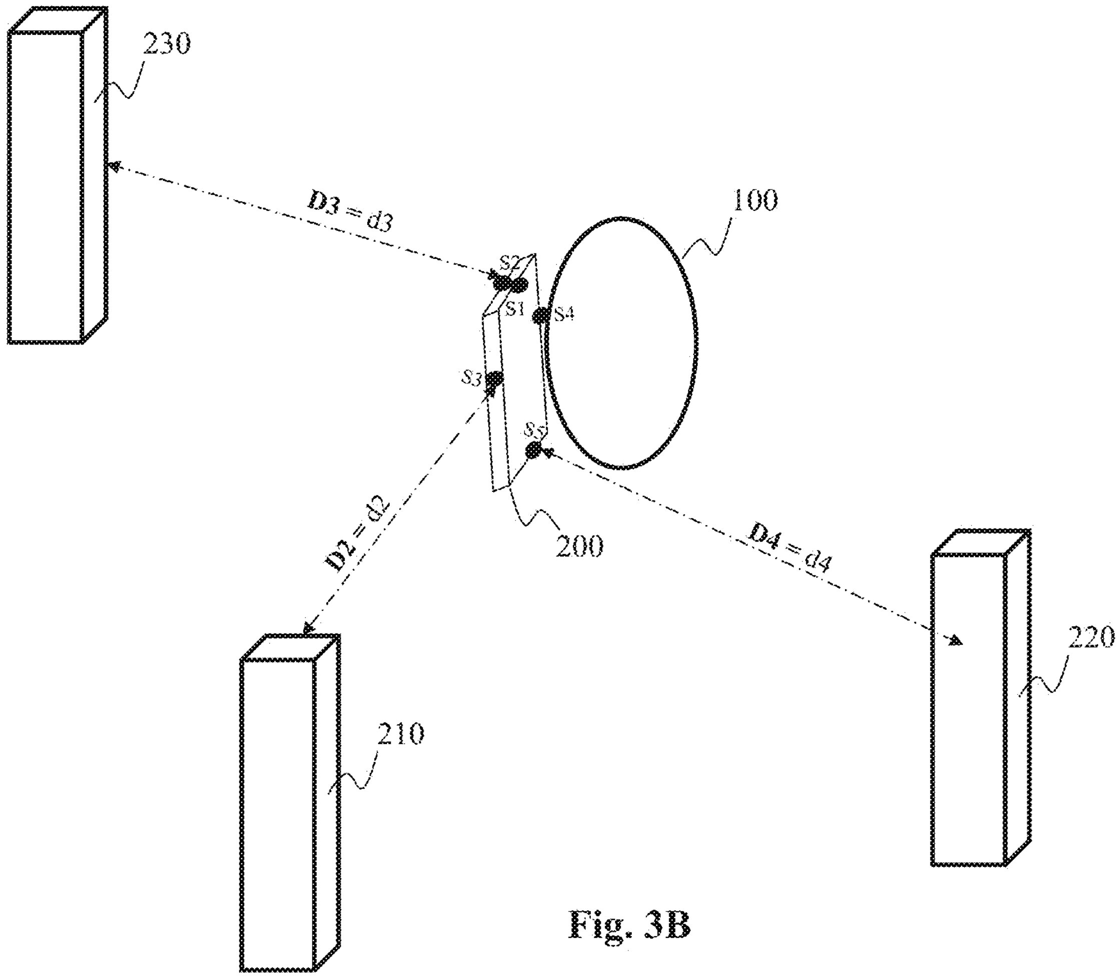
FIG. 3B illustrates an exemplary operational scheme of a built-in walking guard for detecting surrounding of a handheld device held next to the right ear of a user, in accordance with an embodiment of the present teaching.

FIG. 3B depicts an exemplary configuration in which a handheld device held next to the right ear of a user detects surrounding of the device, in accordance with an embodiment of the present teaching. In this configuration, sensor blocks S1, S2, S3, and S4 are deployed in the same positions on the device as what is shown in FIG. 2B. As can be seen, the fields of view of sensors in sensor block S4 in this configuration are now directed to the back of the user 100. In general, a motion of the user may be detected by detecting the motion of the device using known technologies. Then a spatial relationship between the user and the device may be recognized, which include that the device is in front of the user as shown in FIG. 2B or on one side of the user as shown in FIG. 3A (next to right ear) or 3C (next to left ear). Depending on the motion direction and spatial relationship between the user and device, sensors in sensor blocks are to be designated to monitor obstacles along a path in the motion direction and the sides of the path.

If the user is moving forward and the device is in front of the user as shown in FIG. 2B, sensors in sensor blocks are configured to monitor the surrounding as shown in FIG. 2B. That is, sensors in S2 are for monitoring the front of the user, sensors in sensor blocks S3 and S4 are for monitor the surroundings of both sides of the user. When the device is held on right side of the user who is moving in a forward direction, sensors in different sensor blocks are configured as shown in FIG. 3B, where sensors in sensor block S3 are to monitor obstacles 210 in the front, sensors in sensor block S2 are to monitor the obstacles 230 on the right side of the user 100. As the user is moving forward in this configuration, sensors in sensor block S4 may not be invoked to gather data. If it is detected that the user is moving in a backward direction, sensors in S4 sensor group may be activated to monitor the obstacles in the opposite direction. In order to monitor the obstacles 220 on the left side of the user, in some situations where sensors in S1 sensor group are not blocked by the face of the user, they may be used to monitor obstacles 220 on the left side of the user 100. In addition, sensors in another sensor block S5 may also be deployed and activated to monitor obstacles 220 on the left side of the user 100.

In FIG. 3B, based on data from sensors in sensor group S3, a distance D2 between the user 100 and each obstacle 210 in the front of the user may be detected and estimated. Sensors in sensor group S2 provide data about surrounding on the right side and such data are used to estimate the distance D3 between the user 100 and an obstacle 230. Similarly, sensor data acquired by sensors in the sensor group S5 are used to estimate the distance D4 between the user 110 and an obstacle 220 on the left of the user 100. In some situations, there may be multiple obstacles in each of the directions. In some embodiments, the built-in walking guard deployed on the device 200 may select one of the obstacles detected that has the shortest distance in making a decision whether it is close enough to the user so that an alert or a warning is warranted. In some embodiments, the built-in guard may also predict in real-time the next distance between the user and an obstacle based on continuously monitored motion of the user as well as the motion of the obstacle based on continuously acquired video information.

Figure 3C:
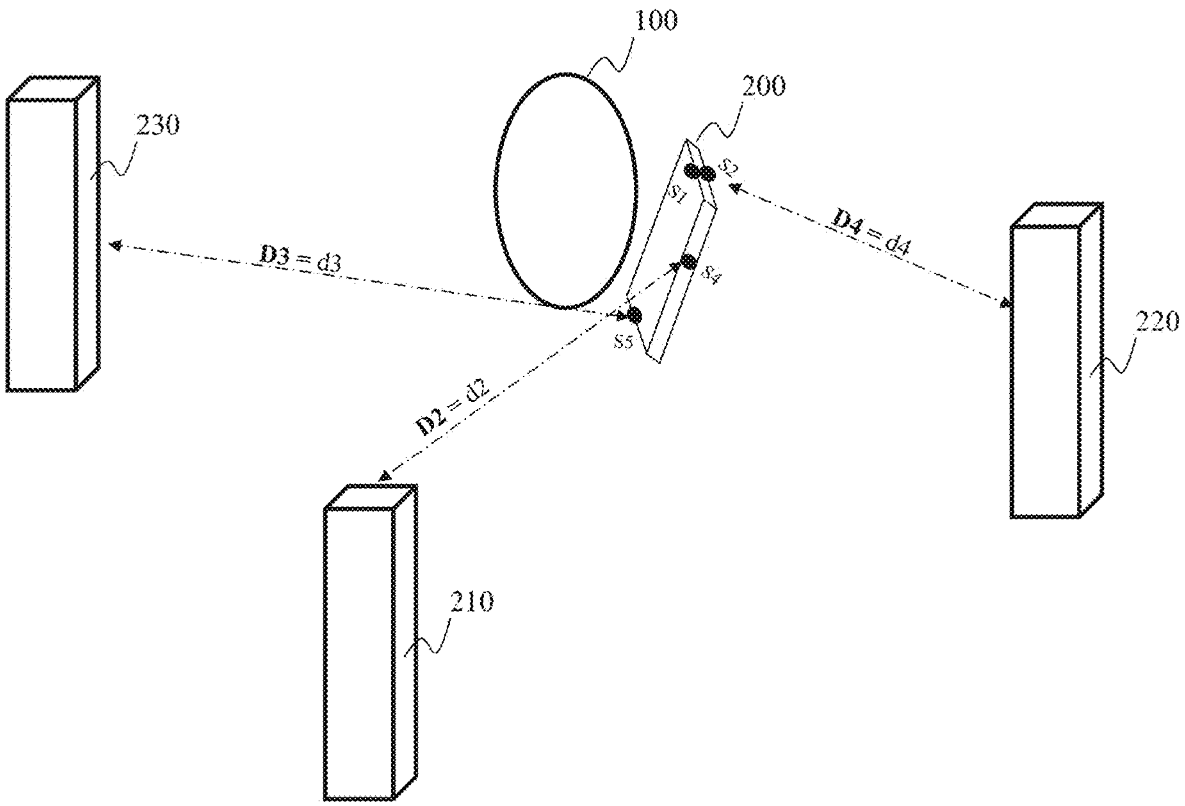
FIG. 3C illustrates an exemplary operational scheme of a built-in walking guard for detecting surrounding of a handheld device held next to the left ear of a user, in accordance with an embodiment of the present teaching.

FIG. 3C illustrates another exemplary configuration in which a device held next to the left ear of a user detects surrounding to provide walking guard to a user, in accordance with an embodiment of the present teaching. In this configuration, the user 100 holds the device next to his/her left ear. This situation is different from the setting where the device is held in front of the user and can be detected via different means and a sensor group may be designated to gather information to facilitate the detection. For example, sensors in sensor group S1 may be designated for that purpose. In some embodiments, sensor group 1 may include a sensor, e.g., a depth sensor, to gather depth information. If the collected depth information reveals that the depth detected (distance between the sensor and the first encountered surface) is substantially and uniformly very small, it may indicate that the user is holding the device next to an ear. This may be easily distinguished from the situation where the user is holding a device in the front, which will cause the depth detected by the same depth sensor in sensor group S1 uniformly much larger.

Figure 4A:
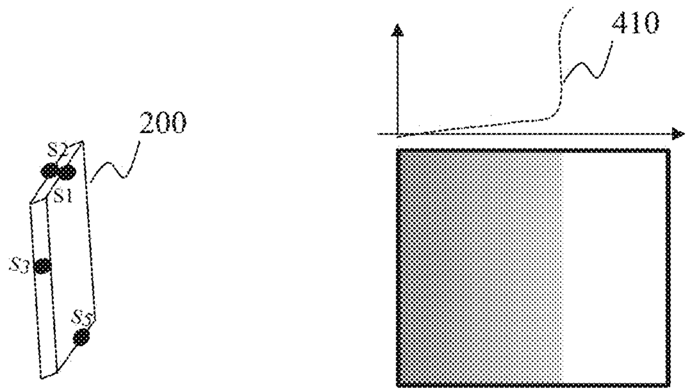
FIGS. 4A-4B depict an exemplary approach to determine whether a device is held near the left or right ear, in accordance with an exemplary embodiment of the present teaching.
Figure 4B:
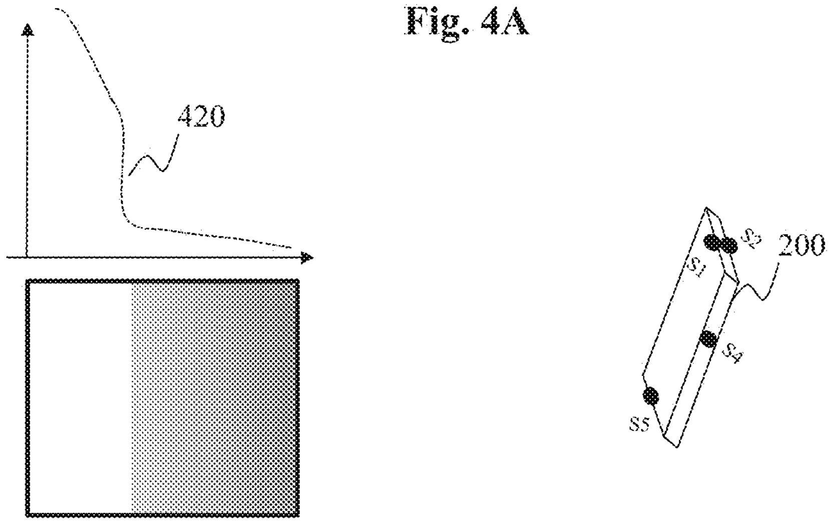

When it is detected that the device is held on one side of the user near the ear, it needs to be determined as to which side the device is held. Such a determination is needed because sensors in different sensor groups need to be allocated appropriately to acquire relevant information from different regions around the user. FIGS. 4A-4B depict an exemplary approach to determine whether a device is held near the left or right ear, in accordance with an exemplary embodiment of the present teaching. As discussed herein, when device 200 is held close to an ear, the information acquired by sensors in sensor group S1 may include images, recording either visual or depth information, having a portion thereof corresponding to the close-range face of the user. In some situation, depending on the scope of the field of view of sensors in the sensor group S1, images from S1 sensors may also include information outside of the user's face. As such, information in the S1 images may have a sudden change. For instance, a visual image from an S1 sensor may exhibit a sudden change in intensity because the intensity levels corresponding to the user's face may be very low while that for the part of the image corresponding to exterior surrounding of the user may be much higher. This is shown in FIGS. 4A-4B where 410 and 420 show pixel value changes across image acquired by S1 sensors. This observation applies to both visual and depth images.

Based on the patterns of image pixel value changes, it can be estimated whether the device 200 is held near the left or right ear. For example, when the device 200 is held near the right ear of the user 100, the pixel value changes follow pattern 410 as shown in FIG. 4A, where the pixel values change from lower values on the left of the image to a sudden change to a much higher value at 410. On the other hand, when the device 200 is held near the left ear of the user 100, the pixel value changes follow pattern 420 as shown in FIG. 4B, where the pixel values change from higher values on the left of the image to a sudden drop to much lower values at 420. As discussed herein, this applies to both visual intensity values to depth values.

Figure 5:
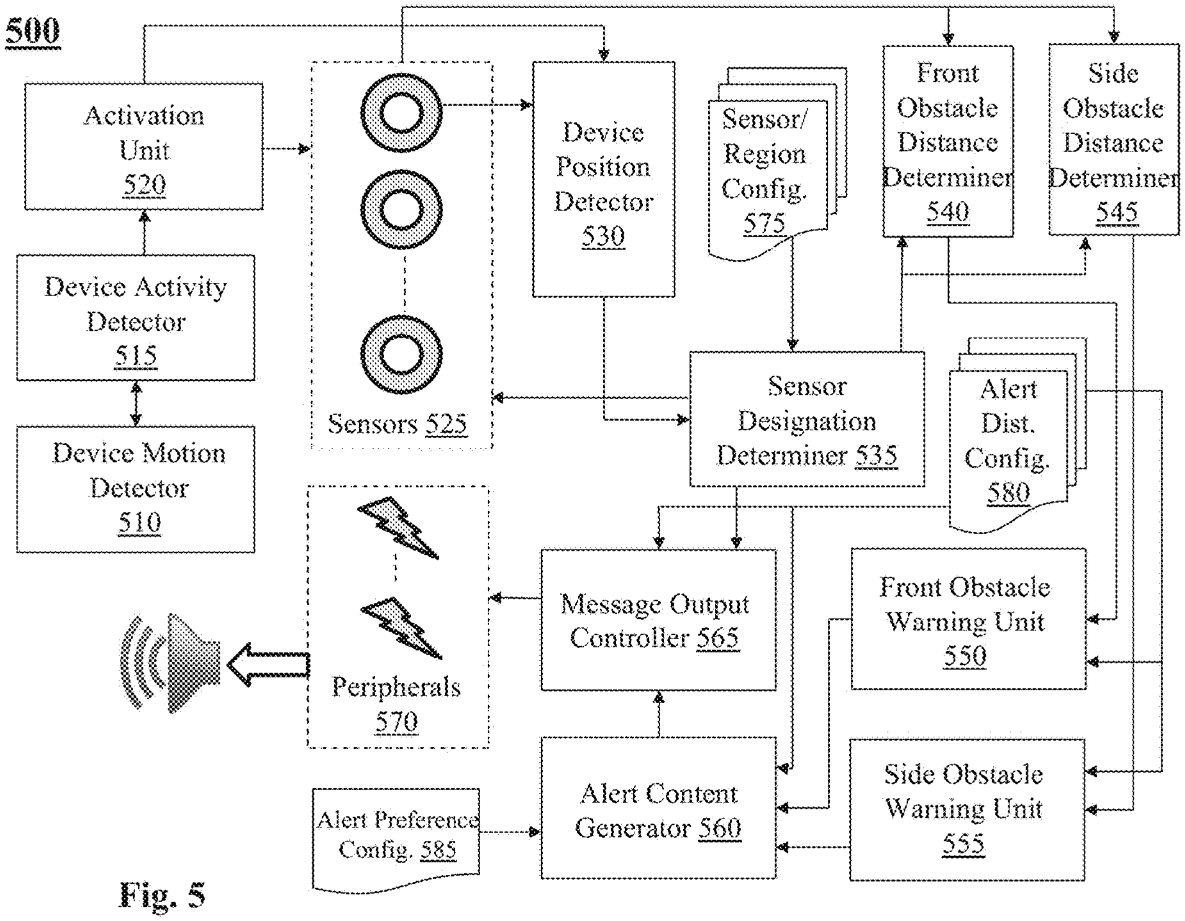
FIG. 5 depicts an exemplary high-level system diagram of a built-in walking guard mechanism, in accordance with an exemplary embodiment of the present teaching.

FIG. 5 depicts an exemplary high-level system diagram of a built-in walking guard mechanism 500, in accordance with an exemplary embodiment of the present teaching. As discussed herein, the built-in walking guard may be deployed on a handheld device as an application which may be activated by a user to monitor surrounding of the user while walking to caution the user when there is any obstacle within a range that is set to warrant an alert. A user may configure the built-in walking guard application to set up personalized parameters. This may include, e.g., criteria related to estimated distances of obstacles, used in determining when to generate an alert to the user. Such criteria may be specified with respect to different directions (front, left side, right side, and back side) and applied accordingly. A user may also specify the type of alert to be applied, e.g., the choice of either a sound or a message which may be popped up on the screen to cause attention. Various parameters may also be specified that are to be applied in generating an alert, e.g., type of sound, volume, font size, style of text (capitalized or not, boldfaced or not, etc.), or color of the text, etc.

In the illustrated embodiment in FIG. 5, the built-in walking guard mechanism 500 comprises three portions, a first portion is for dynamic activation, a second portion is for obstacle detection and distance measurement, and a third portion for alerting the user of nearby obstacles. The first portion of the mechanism 500 incudes a device motion detector 510, a device activity detector 515, and an activation unit 520. When the built-in walking guard is deployed on a device, it may not be activated unless certain conditions are met. For example, when the device is not in motion, e.g., placed on a desk, there is no reason to activate the walking guard. In addition, even when the device is detected in motion, if a user simply is carrying the device in a bag while walking without using the phone, there is also without a reason to activate the walking guard as when a user is not using the device while walking, there is no danger and no need to monitor the surrounding. In some embodiments, it may be set up that only when the device is in motion and the user is actively engaged with the device in some activities, the walking guard application may be activated to proceed to monitor the surrounding of a walking user. The components 510, 515, and 520 are configured to ensure that.

As discussed herein, the second portion of the mechanism 500 is provided for detecting presence of obstacles in different directions and estimating the distances to such obstacles. This portion of the mechanism 500 includes a device position detector 530, a sensor designation determiner 535, a front obstacle distance determiner 540, and a side obstacle distance determiner 545. The device position detector 530 is to determine whether the device is held in front of a user, on one side of the user and if so, which side is it. As discussed herein, the determination of the device position is essential because it will determine sensors in which sensor group are used for capturing which area of the user surrounding. As can be seen in FIG. 2B, when the device 200 is held in front of the user 100, sensors in sensor group 2 are used to capture surrounding information in front of the user. But if the device 200 is held on the right side of the user, as shown in FIG. 3B, sensors in the sensor group S2 are now used to capture the surrounding information on the right side of the user. If the device is held on the left side of the user, as shown in FIG. 3C, the same sensors in the sensor group S2 are now used for capturing the information of the user's surrounding on the left side.

Based on the device position detected by 530, the sensor designation determiner 535 is invoked so that it may designate sensors in different sensor groups for monitoring the information in different regions around the user according to sensor/region configuration stored in 575. As illustrated in the above example, the configuration stored in 575 may specify different scenarios, each of which may be indexed based on a device position and then followed by a series of designations of sensors of which sensor group is to be used to monitor which region around the user. As shown in FIG. 3C, for device position "Right side," the designations of front=[S4], left=[S2], and right=[S5] may be specified. In this case, such designation information generated by the sensor designation determiner 535 may be forwarded to the front obstacle distance determiner 540, which can then acquire sensor data from sensors in sensor group S4. Similarly, such designation information is also sent to the side obstacle distance determiner 545 so that it can accordingly connect to the sensors in sensor group S2 for acquiring surrounding information about the left side of the user and to the sensors in sensor group S5 for acquiring surrounding information about the right side of the user.

Based on the surrounding information from sensors in the appropriately designated sensor group, the front obstacle distance determiner 540 analyzes the sensor information to detect presence of obstacle(s) and then estimates the distance to each detected obstacle. Similarly, based on the surrounding information from sensors in appropriately designated sensor group for monitoring the region on the left side of the user, the side obstacle distance determiner 545 analyzes the sensor information from the left to detect presence of obstacle(s) on the left side of the user and then estimates the distance to each detected obstacle on the left. In the same manner, based on the surrounding information from sensors in appropriately designated sensor group for monitoring the region on the right side of the user, the side obstacle distance determiner 545 also analyzes the sensor information capturing the right region to detect presence of obstacle(s) on the right side of the user and then estimates the distance to each detected obstacle on the right.

As discussed herein, the third portion of mechanism 500 is related to determine when to alert a user and then actually alert the user about nearby obstacles when certain conditions are met. Both a determination on whether to alert a user and the process of alerting the user may be performed based on configurations previously set up. Such configurations may be set up individually by users based on their preferences. As presented previously, each user may specify one or more ranges of distance which may be used to determine when to warn the user. For instance, a user may configure to be alerted if an obstacle is within 2 meters. A user may also set up multiple ranges, e.g., a first range of 4-5 meters, a second range of 3-4 meters, and a third range of 2-3, etc. With respect to each warning range, a preferred alerting method may also be configured. For instance, when an obstacle is in the first range of 4-5 meters, a gentler way to alert may be preferred such as vibration. When an obstacle is in the second range of 3-4 meters, a more urgent alert may be delivered, e.g., an audio alert may be delivered with a gentler voice on an approaching obstacle. When an obstacle is in the close distance of 2-3 meters, the built-in walking guard may be configured to alert the user with a loud and urgent message, which may also be heard by the obstacle approaching the user.

Different users may personalize their own application instances and such personalized configurations may be stored in an alert distance configuration storage 580 based on, e.g., the identity of such users. Similarly, preferences on alerts in different distance ranges may also be specified and stored in, e.g., alert preference configuration storage 585. In operation, an appropriate personalized configuration for the built-in walking guard may be accessed to control how alerting is to be carried out. In some embodiments, the identity of a user may be recognized based on, e.g., face/fingerprint recognition, which can be performed based on user authentication via, e.g., biometric authentication. Such biometric authentication functionality may be embedded in the device or the built-in walking guard may include additional component for that purpose (not shown in FIG. 5). With the identity of a user being recognized, an appropriate configuration associated with the recognized user may be accessed and used for controlling the operation. In this way, the built-in walking guard can be activated to serve the needs of different users in a flexible way according to the preferences of different users.

In this illustrated embodiment, the third portion of the mechanism 500 includes a front obstacle warning unit 550, a side obstacle warning unit 555, an integrated warning unit 560, and a message output controller 565. The front obstacle warning unit 550 is provided for taking input obstacle distances from the front obstacle distance determiner 540 and deciding, based on the configuration for the user stored in the alert distance configuration 580, whether to alert the user on a nearby obstacle in the front of the user. Similarly, the side obstacle warning unit 555 is provided for taking input obstacle distances from the side obstacle distance determiner 545 and deciding, based on the configuration for the user stored in the alert distance configuration 580, whether to alert the user on an obstacle that is on either side of the user. The side obstacle warning unit 555 may determine whether to alert the user for each side separately based on the configuration for that side from the information from 580.

The integrated warning unit 560 is provided for generating the warning message for alerting the user based on decisions from the front obstacle warning unit 550 and the side obstacle warning unit 555. For example, the warning message generated may indicate a distance to each obstacle located in a particular direction. For instance, the warning message may say "there is an obstacle in your front within 2 meters" and/or "an obstacle on your right is getting close and is now within 1.5 meters." The message may also alert the user to take some actions such as "please look around" or "please slow down" or "please stop walking and watch out." Such messages may be specified by the user when configuring the built-in walking guard application or provided by the built-in walking guard in a default setting. The warning messages are generated by the integrated warning unit 560 in accordance with a relevant alert preference configuration (either personalized for the user or in a general configuration in a default setting) retrieved from 585.

After the warning message is generated according to the configuration, the content of the warning message may also be delivered to the user in different ways and may be specified via the alert preference configuration 585. In some configurations, the warning message may be delivered via audio, e.g., the device starts to say the warning message to the user to cause attention. In some configurations, the warning message may be delivered as text to be displayed in different ways (e.g., flashing with big font) on the screen of the device to get attention from the user. In some situations, the acoustic form and textual form may be applied simultaneously. In some situations, the delivery may be configured to also disable the application running on the device that the user is currently interact with. The goal may be to cause enough attention from the user so that the user will look up and/or stop using the device while obstacles are nearby. The delivery options may also be specified in the alert preference configuration.

As discussed herein, the means to deliver a warning message to the user of a device may be specified in an alert preference configuration in 585, either personalized for the user or specified in a default setting. For example, a configuration for a delivery means may indicate that the warning message is to be delivered in an audio form with certain execution parameters such as an acoustic volume level, which may be specified as a function of the distance to the obstacle (e.g., the shorter the distance, the higher the volume). Similarly, if the warning message is specified to be delivered as text, the configuration for the delivery means may indicate certain parameters for textual delivery such as font size, style (capitalized letter or boldfaced), color of the text, or some level of flashing when showing the text, etc. Such textual delivery parameters may also be set as a function of the distance of the obstacle (e.g., the closer the obstacle, the bigger the font size and the level of flashing of the text). As discussed herein, the delivery of a warning message may also be accompanied with an automated halt of an application that the user is currently interacting with. So, the alert preference configuration may also be used to instruct the built-in walking guard application to communicate with the device system in order to preempt the operation of an active application running on the device while delivering a warning message to the user.

Upon generating the warning message in accordance with the alert preference configuration from 585, the integrated warning unit 560 sends the generated warning message to the message output controller 565, together with an instruction on how the message is to be delivered and the delivery parameters specified in the alert preference configuration. The message output controller 565 then accordingly deliver the warning message to the user based on the delivery parameters. To do so, the message output controller 565 is connected to different peripherals 570 of the device in order to deliver the warning message via different channels as needed. For instance, such peripherals include a speaker, the display screen, etc. In some embodiments, the message output controller 565 may also communicate with the operating system of the device in order to, e.g., stall the operation of a relevant application running on the device.

Figure 6:
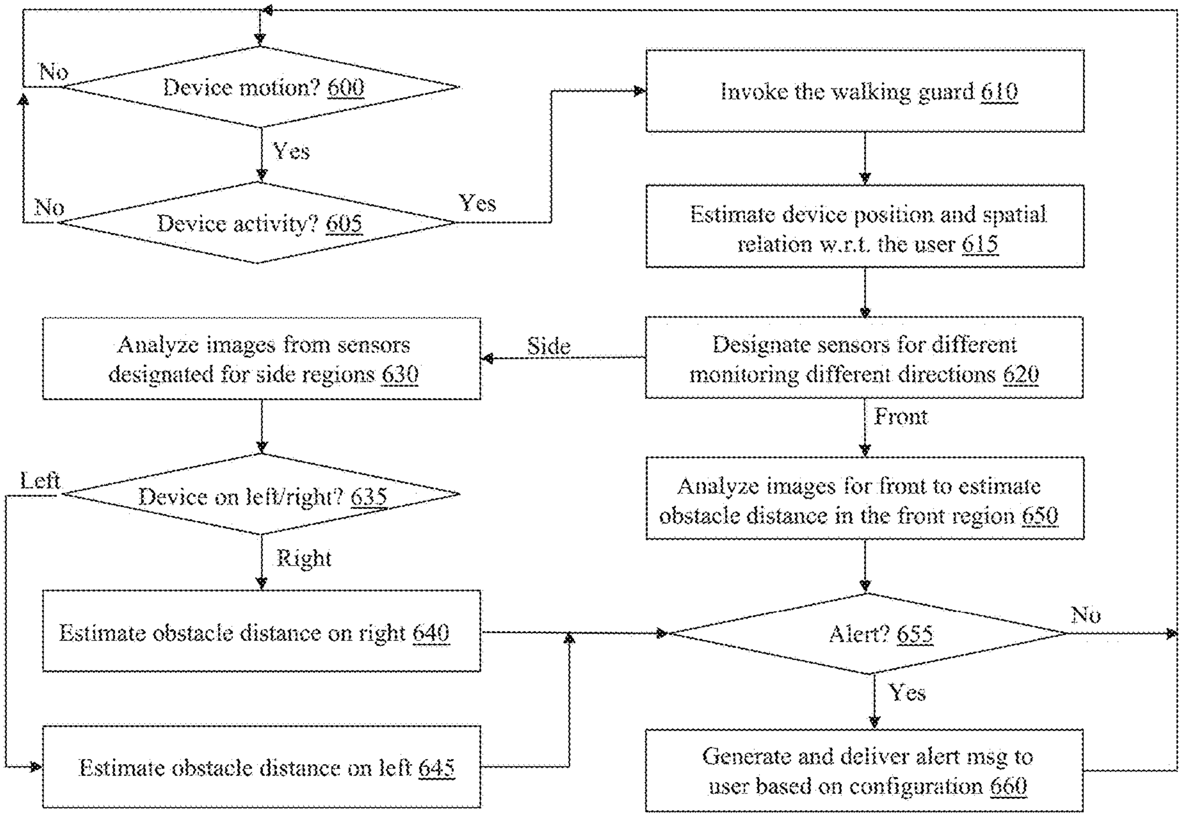
FIG. 6 is a flowchart of an exemplary process of a built-in walking guard mechanism, in accordance with an exemplary embodiment of the present teaching.

FIG. 6 is a flowchart of an exemplary process of the built-in walking guard mechanism 500, in accordance with an exemplary embodiment of the present teaching. It is detected first, at 600, by the device motion detector 510 whether the device is in motion. If no device motion is detected, there is no need to activate the built-in walking guard. In this case, the device motion detector 510 continues to monitor the device motion at 600. When the device motion is detected, determined at 600, the device motion detector 510 invokes the device activity detector 515 to determine, at 605, whether there are any user activities on the device. For instance, such activities may include that the user is interacting with an application running on the device or the user is on a call. If there is no user activity detected, there is no need to activate the walking guard. For example, if a user carries a smart phone in the pocket and walking on street. In this case, there is no need to activate the walking guard and the device motion detector 510 and the device activity detector 515 continue to monitor the device motion and device activities.

When both device motion and user activities are detected on the device, it likely indicates a situation where the user is interacting with an application running on the device while walking so that the activation unit 520 is invoked to activate, at 610, the walking guard installed on the device. To operate properly based on a relative spatial relationship between the device and the user, the device position detector 530 receives sensor information from a designated sensor group (e.g., cameras and/or depth sensor from sensor group S1 as discussed herein) and analyzed the images to estimate, at 615, the position of the device and its spatial relationship with the user. In accordance with the detected spatial relationship between the device and the user, the sensor designation determiner 535 designates, at 620, sensors from each relevant sensor group for monitoring certain region based on, e.g., configuration in 575 specifying the sensor/region configuration paring based on detected spatial relationships.

With sensors in different sensor groups designated appropriately for monitoring different regions around the user, both the front obstacle distance determiner 540 and the side obstacle distance determiner 545 are invoked for detecting obstacles and estimating distances of such detected obstacles, respectively. Specifically, the front obstacle distance determiner 540 analyzes, at 650, images from sensors in sensor groups designated for monitoring the front region of the user in order to detect obstacles and estimate a distance to each of the obstacles. Similarly, the side obstacle distance determiner 545 analyzes, at 630, images from sensors in sensor groups designated for monitoring the side regions of the user in order to detect obstacles in the side regions of the user. Based on images from sensors designated to monitor the right region of the user, the side obstacle distance determiner 545 estimates, at 640, the distance to each of the obstacles detected in the right region. Based on images from sensors designated to monitor the left region of the user, the side obstacle distance determiner 545 estimates, at 645, the distance to each of the obstacles detected in the left region.

Based on the distances estimated for different obstacles detected in respective regions, the front obstacle warning unit 550 and the side obstacle warning unit 555 determine, at 655, whether to alert the user based on the alert distance configuration from 580. In some embodiments, if the obstacles and their distances estimated do not warrant an alert according to the configuration, the process returns to step 600 to determine whether there are still device motion and user activities with the device. This may be reasonable because the situation of the user walking while interacting with the device may change at any moment. In some embodiments, if it is determined that none of the obstacle detected warrants an alert, the processing may return to step 615 (not shown) to determine the spatial relationship between the device and the user (may change over time). If any of the obstacles detected from any of the monitored regions satisfies the condition set in the alert distance configuration 580, the integrated warning unit 560 is activated to generate, at 660, a warning message in accordance with the alert preference configuration 585 based on the position of the obstacle that gives rise to the alert.

As discussed herein, the warning message so generated incorporates or integrates all relevant information in a warning message to provide an informative and adequate warning to the user. In some embodiments, the warning message may be simply a sound if it is configured so. In some embodiments, the warning message may incorporate more detailed and specific information. For instance, if the obstacle that causes the warning is in the front of the user with distance X to the user, the warning message is generated to point out the relevant information on where the obstacle is and how close is it. In this case, the warning message may be delivered in acoustic or textual form, as discussed herein. The acoustic delivery may use text to speech techniques, either existing or developed in the future. In addition, parameters to be used to control the delivery of the warning message are also integrated with respect to the content of the warning message. For instance, appropriate parameters to be used to control the delivery of the warning message may be generated to indicate, e.g., the form of delivery (audio or textual), the volume or style of the text, color if applicable, whether to flash light, etc., in accordance with the preference configuration as well as the severity of the situation. Such integrated warning message is then sent to the message output controller 565 which then executes the delivery instruction received and delivers the warning message to the user via the device.

In some embodiments, the integrated warning message includes content of warning message for each of the obstacles that satisfy the alert distance conditions specified in the alert distance configuration. In some embodiments, the integrated warning message may include warning messages only for several obstacles, e.g., the top three most close to the user. In some situation, the configuration may specify to warn only the closest obstacle. When the warning is to be delivered for multiple obstacles, a sequence or order of delivering the warning messages for different obstacles may be determined. For instance, the sequence or order may be determined based on the distance between the user and the obstacle, e.g., the closer it is, the earlier it is to deliver the warning message to the user. Other criteria may also be used. For example, it an obstacle is also moving, it can be detected and classified into, e.g., whether the obstacle is moving away from the user or moving towards the user and at what speed. Such motions may be estimated based on existing or future developed techniques.

When information about both the obstacle motion and user's motion is available, it may also be estimated as to the time the two will collide. In this situation, the shorter the time needed for an obstacle to collide with the user, the more urgent it is to warn the user. Thus, the obstacles and their warning messages may be ranked or ordered based on the estimated time for the user to run into the obstacles. Once ranked, the warning messages for different obstacles may then be delivered to the user in the order as ranked according to the urgency.

Figure 7:
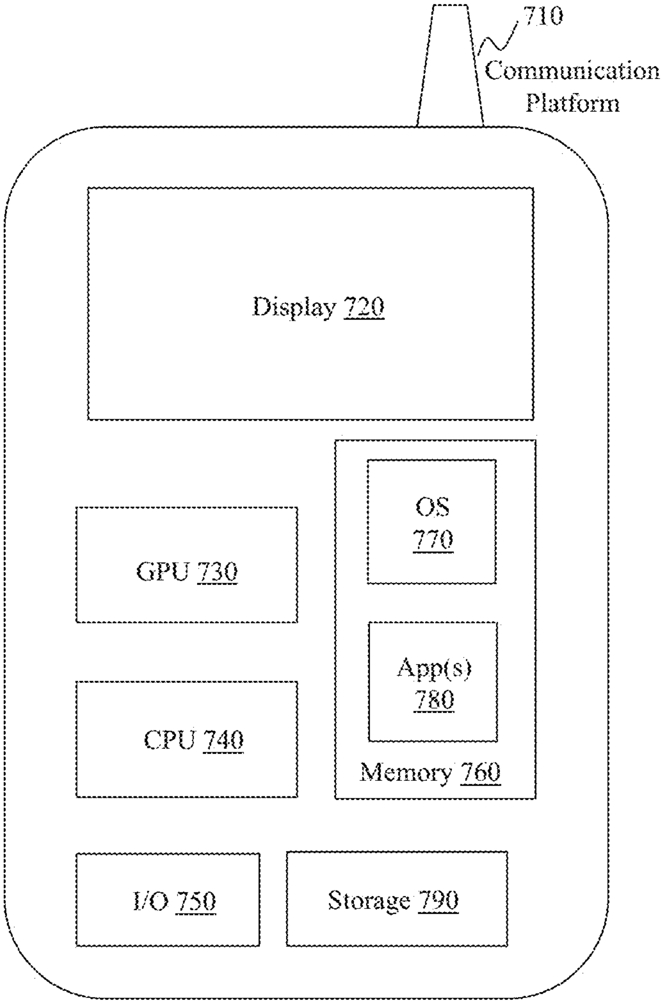
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a user interface or any other suitable mobile apps for information analytics and management according to the present teaching on, at least partially, the mobile device 700. User interactions, if any, may be achieved via the I/O devices 750 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
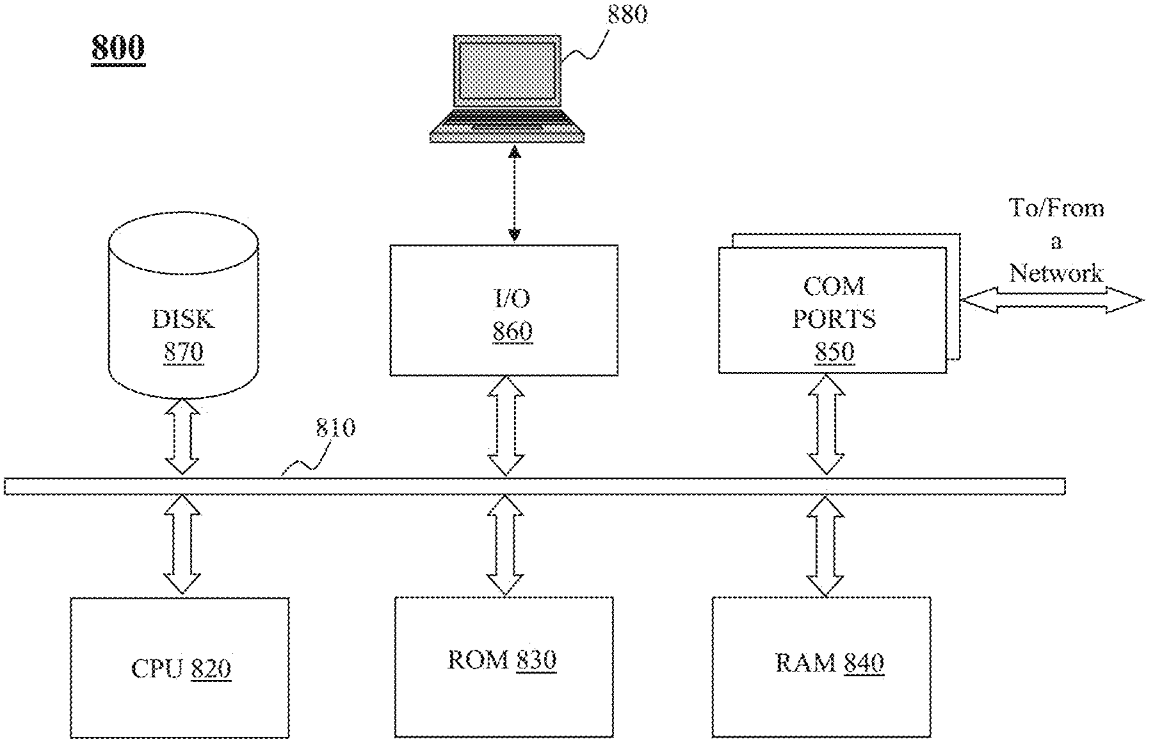
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information analytical and management method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one processor, a memory, and a communication platform for guarding a walking environment, comprising:
- detecting automatically that a user is actively interacting with a device while walking;
- detecting, based on sensor data from a designated one of a plurality of sensors deployed on the device, a location of the device relative to the user either in front of the user's face or near one of the user's ears;
- if the device is held near one of the user's ears,
  - further determining if the device is near the user's left ear or the user's right ear,
  - allocating remaining of the plurality of sensors to monitor obstacles in distinct directions around the user according to:
  - a first configuration if the device is near the user's left ear,
  - a second configuration if the device is near the user's right ear;
- if the device is in front of the user's face, allocating, according to a third configuration, the plurality of sensors to monitor obstacles in the distinct directions around the user;
- for each of the obstacles detected in a corresponding direction,
  - estimating a distance between the user and the obstacle, and
  - delivering, with respect to the obstacle in a corresponding direction, a warning via the device to the user alerting the user about the obstacle in the corresponding direction when the distance satisfies an alert condition.

2. The method of claim 1, wherein the step of detecting that a user is actively interacting with a device while walking comprises:
- determining whether the device is in motion based on information from the device;
- determining whether there is a user activity indicative of interaction with the device;
- if the device is in motion and there is a user activity, indicating that the user is actively interacting with the device while walking.

3. The method of claim 1, wherein the step of detecting the location of the device comprises:
- receiving sensor data from the designated sensor;
- estimating a proximity between the head of the user and the device based on the sensor data from the designated sensor; and
- determining, based on the proximity, the location of the device, which is either in front of the user's face or near one of the user's ears.

4. The method of claim 1, wherein the step of further determining comprises:
- analyzing sensor data from the designated sensor to detect a pattern of change in the values of the sensor data;
- determining that the device is near the user's left ear if the pattern of change satisfies a first condition; and
- determining that the device is near the user's right ear if the pattern of change satisfies a second condition.

5. The method of claim 4, wherein the sensor data from the designated sensor is one of:
- an image captured in a field of view with values therein representing intensities; and
- a depth map captured with values therein representing the distances, wherein
- the pattern of change indicates a change in distribution of values in the sensor data.

6. The method of claim 1, wherein the step of delivering comprises:
- obtaining a configuration specifying an alert preference with respect to a warning message in alerting a user about an obstacle detected;
- generating content of the warning according to the alert preference with information about the obstacle, the direction of the obstacle, and the distance between the obstacle and the user; and
- alerting the user according to the generated content to warn the user the presence of the obstacle.

7. The method of claim 6, wherein
- the alert condition is personalized with respect to the user;
- the alert preference specifies to deliver the warning via at least one of
  - an acoustic signal,
  - a visual signal presented on the device, and
  - a combination thereof.

8. A machine readable and non-transitory medium having information recorded thereon, wherein the information, when read by the machine, causes the machine to perform the following steps:
- detecting automatically that a user is actively interacting with a device while walking;

detecting, based on sensor data from a designated one of a plurality of sensors deployed on the device, a location of the device relative to the user either in front of the user's face or near one of the user's ears;

if the device is held near one of the user's ears, further determining if the device is near the user's left ear or the user's right ear, allocating remaining of the plurality of sensors to monitor obstacles in distinct directions around the user according to:

a first configuration if the device is near the user's left ear, a second configuration if the device is near the user's right ear;

if the device is in front of the user's face, allocating, according to a third configuration, the plurality of sensors to monitor obstacles in the distinct directions around the user;

for each of the obstacles detected in a corresponding direction, estimating a distance between the user and the obstacle, and delivering, with respect to the obstacle in a corresponding direction, a warning via the device to the user alerting the user about the obstacle in the corresponding direction when the distance satisfies an alert condition.

9. The medium of claim 8, wherein the step of detecting that a user is actively interacting with a device while walking comprises:

determining whether the device is in motion based on information from the device;

determining whether there is a user activity indicative of interaction with the device;

if the device is in motion and there is a user activity, indicating that the user is actively interacting with the device while walking.

10. The medium of claim 8, wherein the step of detecting the location of the device comprises:

receiving sensor data from the designated sensor;

estimating a proximity between the head of the user and the device based on the sensor data from the designated sensor; and determining, based on the proximity, the location of the device, which is either in front of the user's face or near one of the user's ears.

11. The medium of claim 8, wherein the step of further determining comprises:

analyzing sensor data from the designated sensor to detect a pattern of change in the values of the sensor data;

determining that the device is near the user's left ear if the pattern of change satisfies a first condition; and determining that the device is near the user's right ear if the pattern of change satisfies a second condition.

12. The medium of claim 11, wherein the sensor data from the designated sensor is one of:

an image captured in a field of view with values therein representing intensities; and a depth map captured with values therein representing the distances, wherein the pattern of change indicates a change in distribution of values in the sensor data.

13. The medium of claim 8, wherein the step of delivering comprises:

obtaining a configuration specifying an alert preference with respect to a warning message in alerting a user about an obstacle detected;

generating content of the warning according to the alert preference with information about the obstacle, the direction of the obstacle, and the distance between the obstacle and the user; and alerting the user according to the generated content to warn the user the presence of the obstacle.

14. The medium of claim 13, wherein the alert condition is personalized with respect to the user; the alert preference specifies to deliver the warning via at least one of an acoustic signal, a visual signal presented on the device, and a combination thereof.

15. A system for guarding a walking environment, comprising:

a device activity detector implemented by a processor and configured for detecting automatically that a user is actively interacting with a device while walking;

a device position detector implemented by a processor and configured for detecting, based on sensor data from a designated one of a plurality of sensors deployed on the device, a location of the device relative to the user either in front of the user's face or near one of the user's ears;

a sensor designation determiner implemented by a processor and configured for:

if the device is near one of the user's ears, further determining if the device is near the user's left ear or the user's right ear, allocating remaining of the plurality of sensors to monitor obstacles in distinct directions around the user according to:

a first configuration if the device is near the user's left ear, and a second configuration if the device is near the user's right ear, and if the device is in front of the user's face, allocating, according to a third configuration, the plurality of sensors to monitor obstacles in the distinct directions around the user;

at least one distance determiner implemented by a processor and configured for estimating, for each of the obstacles detected in a corresponding direction, a distance between the user and the obstacle; and a message output controller implemented by a processor and configured for delivering, with respect to each of the obstacles detected in a corresponding direction, a warning via the device to the user alerting the user about the obstacle in the corresponding direction when the distance satisfies an alert condition.

16. The system of claim 15, wherein the step of detecting that a user is actively interacting with a device while walking comprises:

determining whether the device is in motion based on information from the device;

determining whether there is a user activity indicative of interaction with the device;

if the device is in motion and there is a user activity, indicating that the user is actively interacting with the device while walking.

17. The system of claim 15, wherein the step of detecting the location of the device comprises:

receiving sensor data from the designated sensor;

estimating a proximity between the head of the user and the device based on the sensor data from the designated sensor; and determining, based on the proximity, the location of the device, which is either in front of the user's face or near one of the user's ears.

18. The system of claim 15, wherein the step of further determining comprises:

analyzing sensor data from the designated sensor to detect a pattern of change in the values of the sensor data;

determining that the device is near the user's left ear if the pattern of change satisfies a first condition; and determining that the device is near the user's right ear if the pattern of change satisfies a second condition.

19. The system of claim 18, wherein the sensor data from the designated sensor is one of:

an image captured in a field of view with values therein representing intensities; and a depth map captured with values therein representing the distances, wherein the pattern of change indicates a change in distribution of values in the sensor data.

20. The system of claim 15, wherein the step of delivering comprises:

obtaining a configuration specifying an alert preference with respect to a warning message in alerting a user about an obstacle detected;

generating content of the warning according to the alert preference with information about the obstacle, the direction of the obstacle, and the distance between the obstacle and the user; and alerting the user according to the generated content to warn the user the presence of the obstacle, wherein the alert condition is personalized with respect to the user;

the alert preference specifies to deliver the warning via at least one of an acoustic signal, a visual signal presented on the device, and a combination thereof.

* * * * *